(12) United States Patent
Carobbio

(10) Patent No.: US 7,477,059 B2
(45) Date of Patent: Jan. 13, 2009

(54) METHOD TO DETERMINE THE CONTENTS LEVEL OF A FIRST FLUID IN A CONTAINER AND TO DETERMINE A PRESENCE OF A SECOND FLUID BELOW THE FIRST FLUID AND LEVEL MEASUREMENT APPARATUS TO EXECUTE SAID METHOD

(75) Inventor: Vittorino Carobbio, Vimodrone (IT)

(73) Assignee: Endress & Hauser GmbH & Co. KG, Maulburg (DE)

( * ) Notice: Subject to any disclaimer, the term of this patent is extended or adjusted under 35 U.S.C. 154(b) by 0 days.

(21) Appl. No.: 11/646,394

(22) Filed: Dec. 28, 2006

(65) Prior Publication Data
US 2007/0194799 A1 Aug. 23, 2007

(30) Foreign Application Priority Data
Dec. 29, 2005 (EP) ................................ 05028642

(51) Int. Cl.
*G01R 27/32* (2006.01)
(52) U.S. Cl. ................ 324/644; 342/124; 73/290; 340/665; 137/391
(58) Field of Classification Search ................ 324/644
See application file for complete search history.

(56) References Cited

U.S. PATENT DOCUMENTS

| | | | | |
|---|---|---|---|---|
| 6,000,425 A | * | 12/1999 | Steinorth | 137/391 |
| 6,445,192 B1 | * | 9/2002 | Lovegren et al. | 324/644 |
| 6,481,276 B1 | * | 11/2002 | Neuhaus et al. | 73/304 C |
| 2002/0026828 A1 | * | 3/2002 | Fehrenbach et al. | 73/290 V |
| 2004/0099058 A1 | * | 5/2004 | Edvardsson | 73/290 V |
| 2004/0140814 A1 | * | 7/2004 | Bietz et al. | 324/644 |
| 2005/0057264 A1 | * | 3/2005 | Klofer | 324/644 |
| 2005/0241391 A1 | * | 11/2005 | Kull | 73/313 |
| 2005/0264440 A1 | * | 12/2005 | Smith | 342/124 |
| 2007/0109143 A1 | * | 5/2007 | Klofer et al. | 340/665 |
| 2007/0236385 A1 | * | 10/2007 | Kleman et al. | 342/124 |

FOREIGN PATENT DOCUMENTS

| | | |
|---|---|---|
| DE | 873 307 | 4/1953 |
| GB | 2 358 535 A | 7/2001 |

OTHER PUBLICATIONS

Weiss, Mathias, and Knochel, Reinhard, A Novel Method of Determining the Permittvity of Liquids, IEEE Transactions on Instrumentation and Measurement, vol. 49, No. 3, Jun. 2000.*

* cited by examiner

*Primary Examiner*—Vincent Q Nguyen
*Assistant Examiner*—Benjamin M Baldridge
(74) *Attorney, Agent, or Firm*—Bacon & Thomas, PLLC

(57) ABSTRACT

A level measurement device to measure the fill level of a fluid in a container, and a method to determine the contents level of a first fluid in a container and a presence of a second fluid below the first fluid. Microwave signals generated in the level measurement device are guided on a wave guide that is immersed in the first liquid. The measurement curve from received measurement signals is scanned for a first signal peak indicating a first fluid surface. The measurement curve is also scanned for a potential second signal peak having the same polarity as the first signal peak and thus indicating an interface between the first and a second fluid.

12 Claims, 2 Drawing Sheets

METHOD TO DETERMINE THE CONTENTS LEVEL OF A FIRST FLUID IN A CONTAINER AND TO DETERMINE A PRESENCE OF A SECOND FLUID BELOW THE FIRST FLUID AND LEVEL MEASUREMENT APPARATUS TO EXECUTE SAID METHOD

FIELD OF THE INVENTION

The invention relates to a method to determine the contents level of a first fluid in a container and to determine the presence of a second fluid below the first fluid. The invention also relates to a level measurement apparatus to execute said method.

BACKGROUND OF THE INVENTION

It is well known to determine the contents level of a fluid in a container with a level measurement apparatus that uses electromagnetic measurement signals which are guided by a wave guide being submerged into the fluid. These measurements are also known for microwave signals as Time Domain Reflectometry (TDR) level measurements. According to this measurement principle measurement signals are created and processed in the level measurement apparatus that is usually mounted on the top of the container. The measurement signals are given on a wave guide that is placed inside the container and submerged into the fluid or medium stored in the container. The determination of the contents level is based on measuring the time of flight of the measurement signals from the measurement apparatus along the wave guide to the fluid in the container and from there back to the level measurement apparatus. The measured time of flight of the signals is a measure for the distance from the measurement apparatus to the surface of the fluid whereby the propagation of the measurement signals along the wave guide depend on the dielectric constants of the media surrounding the wave guide in the container. In consideration of predetermined geometrical data of the container the contents level of the fluid can be calculated.

As far as a contents level of a single fluid is measured in the container the aforementioned common measurement methods are very reliable. Problems occur when a second fraction or phase separates from the fluid such that finally two fluid volumes can be found in the container. If for example an emulsion of oil and water separates more and more in the container whereof the water fraction is small compared to the volume of the oil fraction. Most of the common TDR level measurements would not even recognize a small water fraction and if they do an exact dielectric constant of the water fraction must be known and used in calculating the volumes of the water and of the oil fractions. This usually ends up in a recalibration of the TDR level measurement instrument concerned.

SUMMARY OF THE INVENTION

Accordingly it is an object of the present invention to provide a method and apparatus to allow for an easier determination of the level contents of a first fluid and of the presence and volume of a second fluid in the container if present.

This object is realized by a new method according to the invention which method serves to determine and indicate the contents level of a first fluid stored in a container and to evaluate a potential presence of a second fluid below the first fluid, which method comprising the following steps:

generating microwave measurement signals in a level measurement apparatus mounted on the container;
transmitting the microwave measurement signals to a wave guide extending into the container;
guiding the microwave measurement signals on the wave guide towards the first fluid in the container and the potentially present interface between the first and second fluid;
guiding reflected measurement signals on the wave guide back to the level measurement apparatus;
generating a measurement curve in relation to the wave guide length;
scanning such measurement curve for a first signal peak indicating a fill level of the first fluid;
scanning such measurement curve for a second signal peak relative to a bottom region of the wave guide;
if a second signal peak is identified in the measurement curve a phasing of the second signal peak is compared to a phasing of the first signal peak;
a presence or absence of a second fluid below the first fluid in the container is determined in consideration of a presumed relation between the dielectric constants of the fluids;
the contents level of the first fluid is determined in consideration of a present contents or absence of the second fluid in the container.

According to a further embodiment of the new method the presence of the second fluid is indicated in the case,
where the second signal peak has the same phasing or polarity as the first signal peak,
and where it is presumed that the second fluid has a higher dielectric constant than the first fluid.

According to a another embodiment of the new method the absence of the second fluid is indicated in the case,
where a wave guide end represents an increase in characteristic impedance compared to the wave guide as such,
where the second signal peak has a phasing or polarity that is opposite to the phasing of the first signal peak,
and where it is presumed that the second fluid has a higher dielectric constant than the first fluid.

According to still a further embodiment of the new method the presence of the second fluid is indicated in the case,
where the second signal peak has a phasing or polarity that is opposite to that of the first signal peak,
and where the first fluid is presumed to have a higher dielectric constant than the second fluid.

According to still another embodiment of the new method the absence of the second fluid is indicated in the case,
where a wave guide end represents a decrease in characteristic impedance compared to the wave guide as such,
where the second signal peak has the same phasing as the first signal peak,
and where the first fluid a higher dielectric constant than the second fluid.

Yet a further embodiment of the new method allows for
the level measurement apparatus comprising only a single signal output means of the indicating the contents level of the first fluid,
and in the case of the presence of a second fluid a particular supplemental output signal being generated beyond a usual range of the level indicating output signals on the single signal output means.

Yet another embodiment of the new method allows for the presence of a second fluid to be indicated by an analog or digital signal created in the level measurement apparatus and transmitted over a second signal output means.

A still further embodiment of the new method relates the particular output signal indicating the presence of the second fluid in the container being an alarm signal transmitted to a superior control unit.

According to a still other embodiment of the new method a precise dielectric constant of the first fluid is computed as long as no second fluid is present in consideration of the known length of the wave guide and the position of the wave guide end signal peak, which computed dielectric constant of the first fluid is used later to determine an exact interface level between the first and the second fluid in the container.

Yet still another embodiment of the new method allows for the ratio between the dielectric constants of the first and the second fluid being in the order of 0.7 and smaller or 1.4 and larger.

In a further embodiment of the new method at least one particular means serving to remove at least parts of the fluid from the container is controlled by the output signal of the level measurement apparatus.

In a still further embodiment of the new method the output signal activates the control means to remove the second fluid when the second fluid level is above a certain point and deactivates the means to remove the second fluid when the second fluid level is below the wave guide end.

The above mentioned object is also realized by a new level measurement apparatus according to the invention which apparatus executes one of the aforementioned new methods and which apparatus comprises a wave guide the end of which is positioned in the container at a minimum level position of a potential second fluid to be detected.

The above mentioned object is further more realized in another embodiment of a level measurement apparatus that executes one of the aforementioned new methods and which apparatus comprises a wave guide the end of which is positioned in the container at a maximum level position of the second fluid to be allowed in the container.

An advantageous arrangement according to the invention comprises
 a first level measurement apparatus that has a wave guide whereby the end of this wave guide is positioned in the container at a minimum level position of the potential second fluid to be detected; and
 a second level measurement apparatus that has a wave guide whereby the end of this wave guide is positioned in the container at a minimum level position of the potential second fluid.

BRIEF DESCRIPTION OF THE DRAWINGS

The above and other features of the present invention and the manner of attaining them will become apparent, and the invention will be best understood, by reference to the following description and the accompanying drawings, wherein.

DESCRIPTION OF THE PREFERRED EMBODIMENTS

If reasonable and leading to understanding elements and parts of modules, illustrated apparatus, instruments or devices that are essentially identical and of the same function are marked and referenced to by the same numeral.

Figure 1:
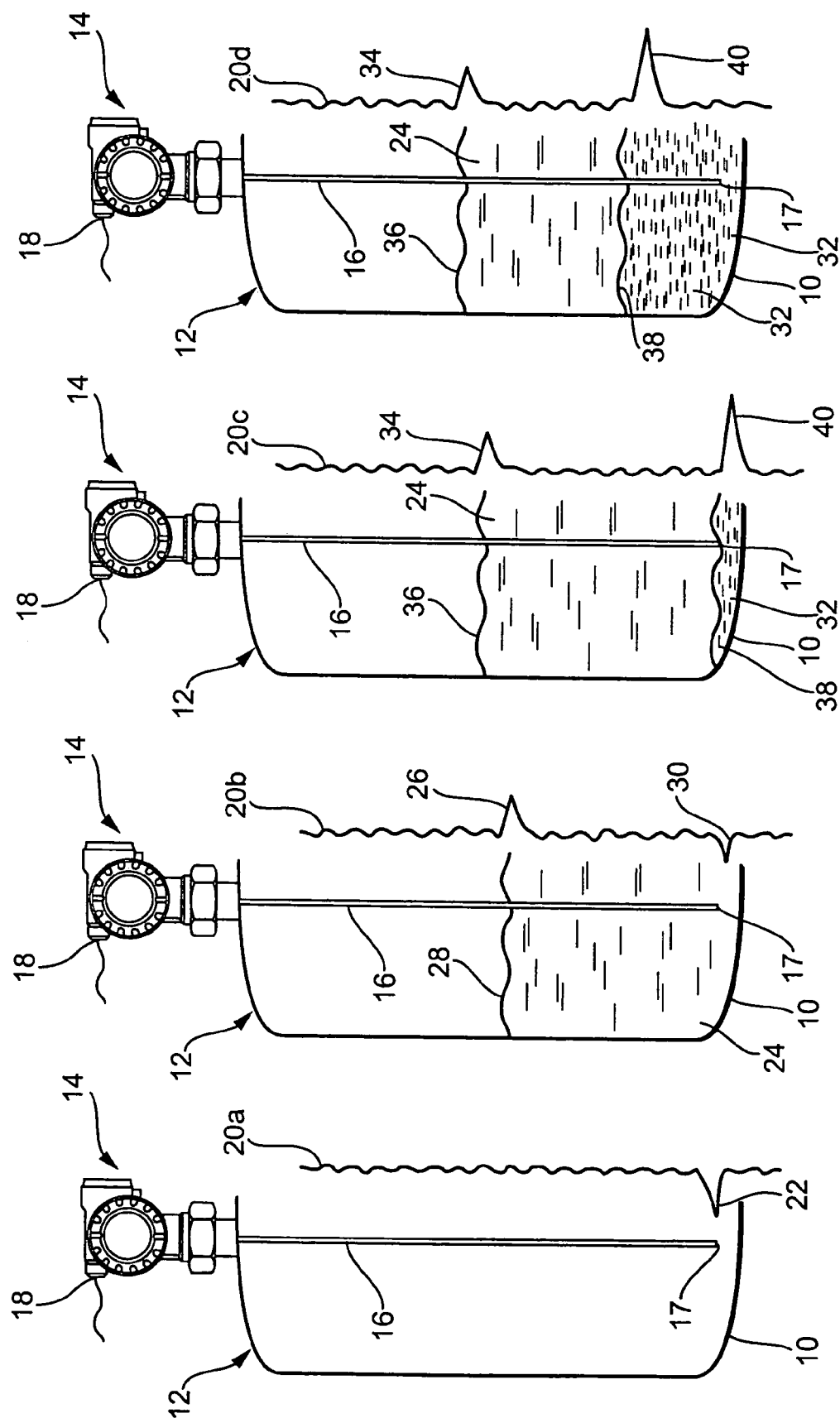
FIGS. 1a)-1d) are schematic side views of an interior of a container with a level measurement apparatus according to a preferred embodiment of the invention mounted on the top of the container illustrating various contents situations.

FIG. 1 comprises four different illustrations FIG. 1a), b), c), d) of filling contents situations in a container 10 which is schematically and for simplicity reasons not entirely shown. On the right hand of each container 10 is drawn a related measurement curve which are referenced by the different numerals 20a, 20b, 20c, 20d because they depend on the different filling situations.

A level measurement apparatus 14 is mounted on a top 12 of the container 10. The level measurement apparatus 14 is a level measurement instrument according to the invention which uses radar or microwave measurement signals. Such measurement signals are created in the level measurement apparatus 14 by a suitable electronic circuitry and given to a wave guide 16 whereon they travel from the level measurement apparatus 14 to a medium or fluid in the container 10. An end 17 of the wave guide 16 is usually not fixed to a bottom of the container 10 as shown in FIG. 1a). The level measurement apparatus 14 is a measurement device for industrial process control and therefore usually not a stand-alone device but is part of a network of industrial process control devices which all are connected via a bus with a central and superior control unit or station not shown here. The level measurement apparatus 14 therefore comprises an output 18 and a cable connected to such output 18 which serve to transmit measured level contents data determined by the level measurement apparatus 14 to the superior control unit.

FIG. 1a) illustrates the situation where no medium or fluid is stored in the container 10. The container 10 is empty and only filled with a gas or mixture or gases, for example ambient air. The measurement curve 20a as illustrated is a simplified and schematic illustration of a signal vs. time or signal vs. way diagram and is related to the length of the wave guide 16. When the container 10 is filled with a medium or fluid the illustrated this measurement curve 20a represents the way that a measurement signal travels from the level measurement apparatus 14 to a fluid in the container where it is reflected at a surface of the fluid. The reflected signal travels back on the wave guide 16 to the level measurement apparatus 14. The signals are processed and a measurement curve is formed by a suitable electronic circuitry. Each time the signal changes its amplitude and/or phasing because of a change of impedance on the wave guide 16 is indicated by a signal peak in the measurement curve. The container 10 in the example situation of FIG. 1a) is empty and the measurement curve 20a has no essential signal changes from the level measurement apparatus 14 until an end 17 of the wave guide 16 where a significant signal peak 22 is created because of significant change of impedance.

FIG. 1b) illustrates schematically the container 10 partially filled with a first fluid 24. The level measurement apparatus 14 according to the invention and mounted on the top 12 of the container 10 is essentially the same as the one aforementioned in illustrated in FIG. 1a). The wave guide 16 is submerged into the first fluid 24. A measurement curve 20b indicates a first signal peak 26 that results from an essential change of impedance at a surface 28 of the first fluid 24 in the container 10 because of a change of medium surrounding the wave guide 16. The measurement signals traveling on the wave guide 16 from the level measurement apparatus 14 in the air filled upper zone of the container 10 arrive at the surface 28 of the first fluid 24 where a part of the signal energy is reflected and forced to travel back to the level measurement apparatus 14. The rest of the signal energy continues to travel along the wave guide 16 until its end 17.

The resulting measurement curve 20b not only indicates the first signal peak 26 resulting from the surface 28 of the first fluid 24 but also indicates a second signal peak 30 resulting from an impedance change caused by the end 17 of the wave guide 16 in the first fluid 24. It could be well recognized from the measurement curve 20 b in FIG. 1b) that the first signal peak 26 has an opposite phasing or polarity than the second signal peak 30 representing the end wave 17 or the wave guide 16.

FIG. 1c) illustrates schematically the container 10 partially filled with a first fluid 24 and a small fraction of a second fluid 32 which is below and under the first fluid 24 in the container 10. In the example illustrated in FIG. 1c) it is presumed that the second fluid 32 has a higher dielectric constant than the first fluid 24. This is typical in cases where the container 10 is a fuel container in a vessel for example, the first fluid 24 is oil or fuel, and the second fluid 32 is water that separates little by little from the first fluid 24 and sediments in the container 10 because of its higher density. The measurement curve 20d in FIG. 1d) indicates a first fluid signal peak 34 which is caused by a reflection signal at a surface 36 of the first fluid 24. A surface 38 of the second fluid 32 below the first fluid 24 causes a reflection of the measurement signals which is indicated as the second fluid signal peak 40 in the measurement curve 20d in FIG. 1d). In the example illustrated in FIG. 1d) the second fluid 32 volume in the container 10 reaches at just the lower end 17 of the wave guide 16. The second fluid signal peak 40 of the measurement curve 20c caused by the surface 38 of the second fluid 32 at the lower end 17 of the wave guide 16 overrides and occludes a signal peak caused by the end 17 of the wave guide which signal peak 22 is illustrated in FIG. 1a) and as signal peak 30 in FIG. 1b). The first fluid 24 in FIG. 1 c) does not fill up the whole lower part of container 10 but only the volume between the two surfaces 36, and 38 of the first and second fluids 24, 32 whereby the surface 38 of the second fluid 32 is situated at the end 17 of the wave guide 16. The real contents of the first fluid 24 in the container 10 is therefore the volume inside the container 10 from the very bottom of the container 10 until the surface 36 of the first fluid 24 minus the volume from the very bottom of the container 10 until the surface 38 of the second fluid 32.

FIG. 1d) illustrates schematically a situation where the volume of the second fluid 24 has increased in comparison to the situation illustrated in FIG. 1c). The container 10 is partially filled with the first fluid 24 and a now greater fraction of a second fluid 32 located below the first fluid 24 in the container 10. Again, like for the example illustrated in FIG. 1c) it is presumed that the second fluid 32 has a higher dielectric constant than the first fluid 24. The measurement curve 20d in FIG. 1d) indicates the first fluid signal peak 34 which is caused by a reflection signal at the surface 36 of the first fluid 24. The surface 38 of the second fluid 32 as the interface between the first and second fluids 24, 32 also causes a reflection of the measurement signals which is indicated as the second fluid signal peak 40 in the measurement curve 20d in FIG. 1d). In the example illustrated FIG. 1d) the second fluid 32 volume in the container 10 reaches over the lower end 17 of the wave guide 16. A signal peak caused by the end 17 of the wave guide is not shown in the measurement curve 20d in FIG. 1d). The real contents of the first fluid 24 in the container 10 is therefore the volume inside the container 10 from very bottom of the container 10 until the surface 36 of the first fluid 24 minus the volume from very bottom of the container 10 until the surface 38 of the second fluid 32. The volume of the first fluid 24 in the container 10 in FIG. 1d) is smaller than in the example of FIG. 1c).

As illustrated by the FIGS. 1a) through 1d) the presence or absence of a second fluid fraction in the container 10 can be clearly detected from the measurement curves 20a through 20d. Particularly FIGS. 1c) and 1d) illustrate that the detection of water as second fluid in the bottom of the container 10 is easily derivable from the measurement curves 20a through 20d from that moment on when the second fluid arrives at the end 17 of wave guide 16.

The following scheme explains how to determine the presence or absence of a second fluid 32 in the container 10 from a second signal peak in the measurement curve 20c or 20d in comparison to the first signal peak 34 of the first fluid 24. The following scheme also explains how the real contents level of the first fluid 24 is determined from the measurement curves 20c or 20d whereby it is presumed that the second fluid, if present, has a higher dielectric constant than the first fluid 24 which is considered to be always present in the container even if no clear first fluid signal peak is detectable in the measurement curve.

| first fluid signal peak | second signal peak | second fluid | determination of first fluid contents level |
| --- | --- | --- | --- |
| present | present; opposite polarity as first fluid signal peak | not present; second signal peak results from end of wave guide | from first fluid signal peak |
| not present | present; opposite polarity as usual or prior first fluid signal peak | not present; second signal peak results from | from variations of second signal peak at end of wave guide |
| present | not present | second fluid may be present | from first fluid signal peak |
| not present | not present | second fluid may be present | not possible; error or alarm signal generated |
| present | present; same polarity as first fluid signal peak | second fluid present | from first fluid signal peak in consideration of second fluid contents |
| not present | present; same polarity | second fluid | not possible; |

-continued

| first fluid signal peak | second signal peak | second fluid | determination of first fluid contents level |
|---|---|---|---|
| | as usual or prior first fluid signal peak | present | error or alarm signal generated |

The method to determine and signalize the contents level of a first fluid stored in a container and to evaluate a potential presence of a second fluid below the first fluid, all according to the invention, is apparent in regard to the above scheme in conjunction with the illustrations of FIGS. 1a) through 1d) in the following summary:

Microwave measurement signals generated in the level measurement apparatus 14 mounted on the top 12 of the container 10 are transmitted to the wave guide 16 that extends into the container 10. The wave guide 16 guides the microwave measurement signals towards the first fluid 24 in the container 10 and to the potentially present interface between the first and second fluid 24 and 32. Measurement signals that are reflected at the surface 28 of the first fluid 24 are guided back on the wave guide 16 to the level measurement apparatus 14. A measurement curve 20b-20d is generated from all measurement signals in relation to the length of the wave guide 16.

The measurement curve 20b-20d is scanned for a first signal peak 26 or 34 indicating a fill level of the first fluid 24 in the container 10. The measurement curve 20b-20d is further scanned for a second signal peak 30 or 40 relative to a bottom region of the wave guide 16 which means at least below the first signal peak 26 or 34 relative to the wave guide 16.

If a second signal peak 30 or 40 is identified in the measurement curve 20b-20d the phasing of the second signal peak 30 or 40 is compared to a phasing of the first signal peak 26 or 34. The presence or absence of the second fluid 32 below the first fluid 24 in the container 10 is determined according to the above scheme, and, depending on that, the contents level of the first fluid 24 is determined in consideration of the second fluid 32 in the container 10. The presence of the second fluid is indicated when the second signal peak 30 or 40 has the same phasing or polarity as the first signal peak 26 or 34, presumed that the second fluid 32 has a higher dielectric constant than the first fluid 24. The absence of the second fluid 32 is indicated when the second signal peak 30 or 40 has a phasing or polarity that is opposite to the phasing of the first signal peak 26 or 34. The second signal peak 30 or 40 in this case is caused by the end 17 of the wave guide 16 that represents an increase in characteristic impedance compared to the wave guide 16 as such, and where it is presumed that the second fluid has a higher dielectric constant than the first fluid.

The presence of the second fluid 32 is indicated when the second signal peak 30 or 40 has a phasing or polarity that is opposite to that of the first signal peak 26 or 34, where the first fluid is presumed to have a higher dielectric constant than the second fluid. Considering that the first fluid 24 has a higher dielectric constant than the second fluid 32 the absence of the second fluid 32 is indicated in the case, where the second signal peak 30 or 40 has the same phasing as the first signal peak 26 or 34 caused by the end 17 of the wave guide 16 representing a decrease in characteristic impedance compared to the wave guide 16 as such.

In the cases in which the exact dielectric constant of the first fluid 24 is not known it may be computed as long as no second fluid 32 is present in consideration of the known length of the wave guide 16 and the position and variations of the second signal peak 30 from the end 17 of the wave guide 16. This situation is illustrated in FIG. 1c) and described above. The computed dielectric constant of the first fluid 24 is used later to determine an exact interface level between the first and the second fluid in the container.

Practical measurements have shown that the determination of whether a second fluid 32 is present or not is well achieved when the ratio between the dielectric constants of the first and the second fluid 24 and 32 is in the order of 0.7 and smaller or 1.4 and larger.

When the installed the level measurement apparatus 14 comprises only a single signal output means 18 for indicating the contents level of the first fluid 24 in the container 10, it is reasonable to signalize the presence of a second fluid 32 by a particular and supplemental output signal to a supervisory or control unit. This particular and supplemental output signal may be generated beyond an usual range of the level indicating output signals on said single signal output means 18. Alternatively the level measurement apparatus 14 may be equipped with a second signal output means to signalize the presence of a second fluid with an analog or digital signal created in the level measurement apparatus and transmitted independently from the first output means 18 to the supervisory or control unit. This distinct analog or digital signal on the second signal output means may be used to control at least one means, a valve for example, that serves to remove at least parts of a fluid from the container 10. In other case the particular output signal to indicate the presence of the second fluid 32 in the container is an alarm signal transmitted to a superior control unit.

Figure 2:
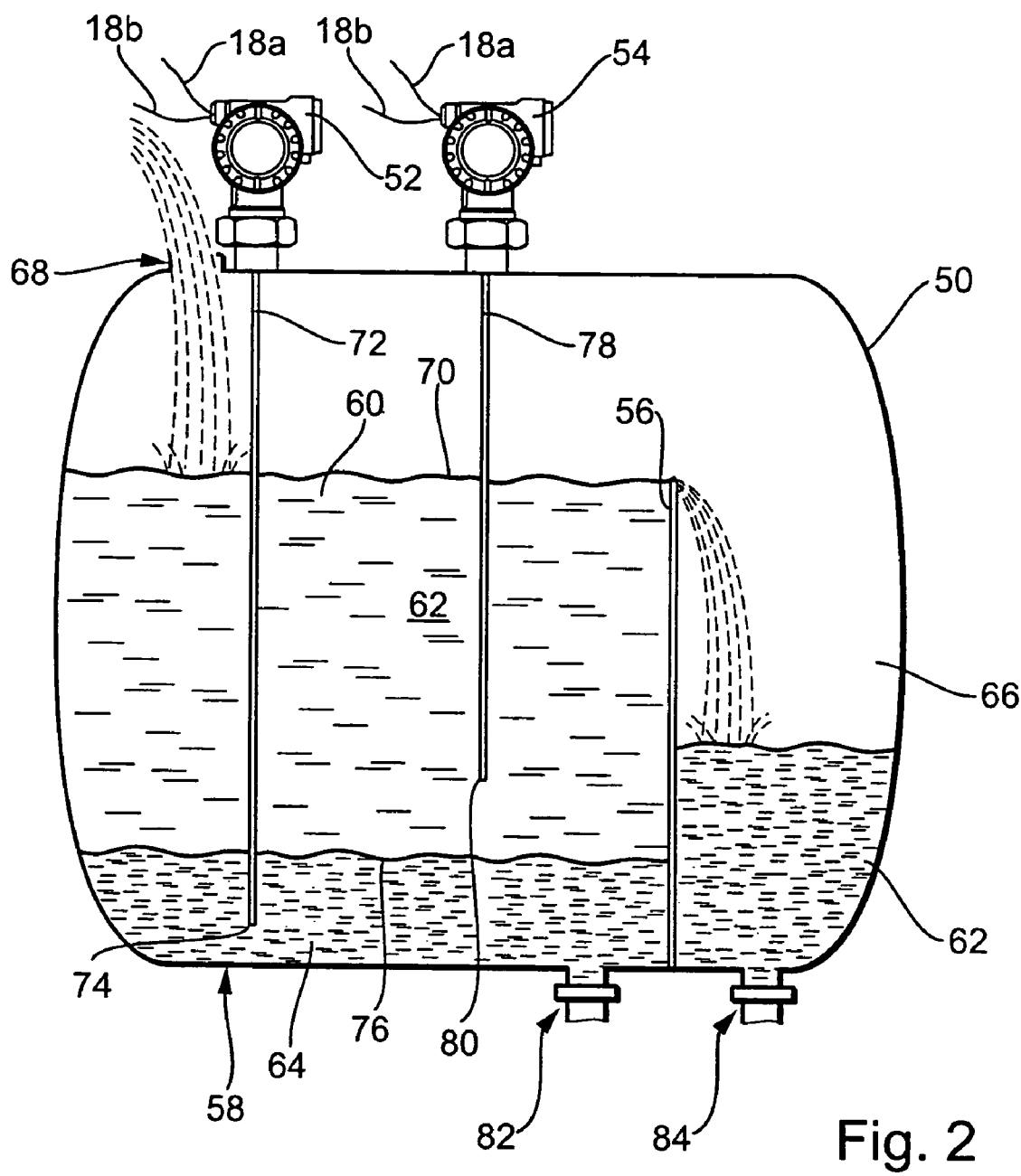
FIG. 2 is a schematic side view of an interior of a container with an arrangement of two level measurement apparatus according to a preferred embodiment.

FIG. 2 is a schematic side view of a partial interior of another particular container 50 which is equipped with an arrangement of two level measurement apparatus 52 and 54 according to a preferred embodiment of the invention. The first level measurement apparatus 52 and the second level measurement apparatus 54 are essentially the same level measurement apparatus as for the example embodiments illustrated in FIGS. 1a) through 1d). Preferably, both level measurement apparatus 52 and 54 have two outputs 18a and 18b for output signal transmission which includes signals indicating the measured contents levels of the fluid or the fluids in the container 50 and further alarm or control signals sent to a superior control unit not shown in FIG. 2. Such container 50 is used for mixture of a first and a second fluid which are expected to and are to be separated inside the container 50 during the storage.

As illustrated in FIG. 2 the container 50 comprises a separating wall 56 mounted in its interior and fixed to a bottom 58 of the container 50. The separating wall 56 separates partly the interior of the container in two chambers up to a predefined height inside the container 50. A greater, first chamber 60 is used to store a first fluid 62 and a second fluid 64 below the first fluid 62. A second chamber 66 is used as an overflow chamber and serves to collect and store first fluid overflowing the separating wall 56. A mixture of the first and second fluids 62 and 64 is pumped and filled into the container 50 via an inlet opening, preferably an inlet stub 68. FIG. 2 illustrates a situation where a certain fraction of the first fluid 62 is already in the second chamber 66 because a surface 70 of the first fluid 62 has already reached the maximum height of the separating wall 56 and flown over into the second chamber 66.

In order to control the ratio of the volumes first and second fluids 62, 64 and in particular to not allow the volume of the second fluid 64 to excess a predefined maximum value the two level measurement apparatus 52 and 54 are arranged in a specific way. A wave guide 72 of the first level measurement apparatus 52 has a length that provides for an end 74 of the wave guide 72 very close to the bottom 58 of the container 50 and for submerging the wave guide 72 into first and second fluids 62 and 64. As described above in accordance to FIG. 1c) and the scheme of how to evaluate the measurement curves 20b through 20d the presence of second fluid 64 is detectable from that moment on when a surface 76 of the second fluid 64 reaches the end 74 of the wave guide 72 of the first level measurement apparatus 52. An alarm signal can be sent to the superior control unit to indicate that the second fluid 64 is present in the first chamber 60 of the container 50 and that its surface has reached a height given by the known position of the end 74 of the wave guide 72 of the first level measurement apparatus 52.

A wave guide 78 of the second level measurement apparatus 54 has a length that is smaller compared to the length of the wave guide 72 of the first level measurement apparatus 52. The wave guide 78 provides for an end 80 also in the first chamber 60 of the container 50 and above the end 74 of the of the other wave guide 72. The wave guide 78 is submerged into the first fluid 62. When the surface 76 of the second fluid 64 reaches the end 80 of the wave guide 78 of the second level measurement apparatus 54 the presence of second fluid 64 at this predefined height in the container 50 is detectable in accordance to the evaluation of the measurement curves 20b through 20d as described above. A signal is now sent to the superior control unit to indicate that the surface 76 of the second fluid 64 has already reached the predefined position of the end 80 of the second level measurement apparatus 54 which position represents the maximum acceptable volume of the second fluid 64 in the container 50. Such signal may directly be used to open a first outlet 82, preferably a remotely controllable valve, in the bottom zone of the first chamber 60 of the container 50 in order to allow the second fluid 64 to flow out and to therefore reduce the volume of the second fluid 64 in container 50. Because of that flow out the surface 76 of the second fluid 64 sinks until it reaches and just passes the end 74 of the wave guide 72 of the first level measurement apparatus 52 which leads to a related signal in the first level measurement apparatus indicating that the volume of the second fluid 64 has reached its minimum accepted value. Such signal may directly be used to close the first outlet 82.

The actual contents level of the first fluid 62 can be determined according to the description relating to FIGS. 1b) through 1d). First level signal peaks 26 or 34 can be read out from measurement curves 20b through 20d from either first level measurement apparatus 52 or second level measurement apparatus 54 or from both. The contents of the first fluid 62 in the first chamber 60 of the container 50 depends on the volume of the second fluid 64 in this chamber 60. The volume of the second fluid 64 ranges from a minimum when its surface 76 reaches the end 74 of the wave guide 72 of the first level measurement apparatus 52 to a maximum volume when its surface 76 reaches the end 80 of the wave guide 78 of the second level measurement apparatus 54. Thus, the volume of the first fluid 62 in the first chamber 60 of container 50 ranges from a minimum when the surface 76 of the second fluid 64 is at the end 80 of the wave guide 78 of the second level measurement apparatus 54 to a maximum when the surface 76 of the second fluid 64 falls down to—and under—the end 74 of the wave guide 72 of the first level measurement apparatus 52.

A second outlet 84, preferably a remotely controllable valve, is installed in the bottom region of the second chamber 66 of container 50 in order to control the volume of first fluid 62 gathering in the second chamber 66 from overflow from the first chamber 60. From time to time and in consideration of the level measurements in the first chamber 60 the second outlet 84 is opened to allow the volume of the first fluid 62 in the second chamber 66 to be reduced.

| Reference Numerals: | |
|---|---|
| 10 | container |
| 12 | top of (10) |
| 14 | level measurement apparat. |
| 16 | wave guide |
| 17 | end of (16) |
| 18 | output - and cable |
| 20a | measurement curve |
| 20b | measurement curve |
| 20c | measurement curve |
| 20d | measurement curve |
| 22 | signal peak for (17) |
| 24 | first fluid |
| 26 | first fluid signal peak |
| 28 | surface of (24) |
| 30 | second fluid signal peak |
| 32 | second fluid |
| 34 | first fluid signal peak |
| 36 | surface of (24) |
| 38 | surface of (32) |
| 40 | second fluid signal peak |
| 50 | container |
| 52 | 1st level measurement apparat |
| 54 | 2nd level measurement apparat |
| 56 | separating wall |
| 58 | bottom of (50) |
| 60 | 1st chamber |
| 62 | first fluid |
| 64 | second fluid |
| 66 | 2nd chamber |
| 68 | inlet stub |
| 70 | surface of (62) |
| 72 | wave guide of (52) |
| 74 | end of (72) |
| 76 | surface of (64) |
| 78 | wave guide of (54) |
| 80 | end of (78) |
| 82 | first outlet |
| 84 | second outlet |

What is claimed is:

1. A method to determine and signalize the contents level of a first fluid stored in a container and to evaluate a potential presence of a second fluid below the first fluid, comprising the steps of:

generating microwave measurement signals in a level measurement apparatus mounted on the container;

transmitting said microwave measurement signals to a wave guide extending into the container;

guiding said microwave measurement signals on the wave guide towards the first fluid in the container and the potentially present interface between the first and second fluid;

guiding reflected measurement signals on the wave guide back to the level measurement apparatus;

generating a measurement curve in relation to the length of the wave guide;

scanning such measurement curve for a first signal peak indicating a fill level of the first fluid;

scanning such measurement curve for a second signal peak relative to a bottom region of the wave guide;

if a second signal peak is identified in the measurement curve a phasing of the second signal peak is compared to a phasing of the first signal peak;

a presence or absence of a second fluid below the first fluid in the container is determined;

the contents level of the first fluid is determined in consideration of a present contents or absence of the second fluid in the container; and whereby the presence of the second fluid is indicated in the case: where the second signal peak has the same phasing or polarity as the first signal peak, and where it is presumed that the second fluid has a higher dielectric constant than the first fluid.

2. The method according to claim 1, whereby the presence of the second fluid is indicated in the case:

where the second signal peak has a phasing or polarity that is opposite to that of the first signal peak, and where the first fluid is presumed to have a higher dielectric constant than the second fluid.

3. The method according to claim 1. whereby the absence of the second fluid is indicated in the case;

where an end of the wave guide represents a decrease in characteristic impedance compared to the wave guide;

where the second signal peak has the same phasing as the first signal peak; and where the first fluid has a higher dielectric constant than the second fluid.

4. The method according to claim 1, whereby:

the level measurement apparatus comprises only a single signal output means for indicating the contents level of the first fluid; and in the case of the presence of a second fluid a particular and supplemental output signal is generated beyond a usual range of the level indicating output signals on the single signal output means.

5. The method according to claim 1, whereby:

the presence of a second fluid is indicated by an analog or digital signal created in the level measurement apparatus and transmitted over a second signal output means.

6. The method according to claim 4, whereby:

the particular output signal to indicate the presence of the second fluid in the container is an alarm signal transmitted to a superior control unit.

7. The method according to claim 1, whereby:

a dielectric constant of the first fluid is computed as long as no second fluid is present in consideration of the known length of the wave guide and the position of the wave guide end signal peak, which computed dielectric constant of the first fluid is used later to determine an exact interface level between the first and the second fluids and in the container.

8. The method according to claim 1, whereby:

the ratio between the dielectric constants of the first and the second fluids is about 0.7.

9. The method according to claim 1, whereby:

the output signal is used to control at least one outlet means that serves to remove at least parts of the fluid from the container.

10. The method according to claim 9, whereby:

the output signal activates the outlet means to remove the second fluid when the second fluid level is above a predefined point and deactivates the outlet means when the second fluid level is below the end of the wave guide.

11. A method to determine and signalize the contents level of a first fluid stored in a container and to evaluate a potential presence of a second fluid below the first fluid, comprising the steps of:

generating microwave measurement signals in a level measurement apparatus mounted on the container;

transmitting said microwave measurement signals to a wave guide extending into the container;

guiding said microwave measurement signals on the wave guide towards the first fluid in the container and the potentially present interface between the first and second fluid;

guiding reflected measurement signals on the wave guide back to the level measurement apparatus;

generating a measurement curve in relation to the length of the wave guide;

scanning such measurement curve for a first signal peak indicating a fill level of the first fluid;

scanning such measurement curve for a second signal peak relative to a bottom region of the wave guide;

if a second signal peak is identified in the measurement curve a phasing of the second signal peak is compared to a phasing of the first signal peak;

a presence or absence of a second fluid below the first fluid in the container is determined;

the contents level of the first fluid is determined in consideration of a present contents or absence of the second fluid in the container; and whereby the absence of the second fluid is indicated in the case, where an end of the wave guide represents an increase in characteristic impedance compared to the wave guide, where the second signal peak has a phasing or polarity that is opposite to the phasing of the first signal peak, and where it is presumed that the second fluid has a higher dielectric constant than the first fluid.

12. The method according to claim 1, whereby:

the ratio between the dielectric constants of the first and second fluids is 1.4 or larger.

* * * * *